(12) United States Patent
Sommervogel et al.

(10) Patent No.: US 10,359,322 B2
(45) Date of Patent: Jul. 23, 2019

(54) METHOD AND DEVICE FOR DETECTING HOT POINTS IN A FACILITY, ESPECIALLY FOR DETECTING LEAKS IN AIR DUCTS

(71) Applicant: Win Ms, Orsay (FR)

(72) Inventors: Laurent Sommervogel, Jouy en Josas (FR); Marc Olivas, Bagnolet (FR); Arnaud Peltier, Gif sur Yvette (FR)

(73) Assignee: WIN MS, Orsay (FR)

( * ) Notice: Subject to any disclaimer, the term of this patent is extended or adjusted under 35 U.S.C. 154(b) by 99 days.

(21) Appl. No.: 15/529,472

(22) PCT Filed: Oct. 15, 2015

(86) PCT No.: PCT/EP2015/073827
§ 371 (c)(1),
(2) Date: May 24, 2017

(87) PCT Pub. No.: WO2016/087105
PCT Pub. Date: Jun. 9, 2016

(65) Prior Publication Data
US 2017/0261383 A1    Sep. 14, 2017

(30) Foreign Application Priority Data
Dec. 1, 2014  (FR) ...................... 14 61710

(51) Int. Cl.
*G01K 7/00*  (2006.01)
*G01K 7/16*  (2006.01)
(Continued)

(52) U.S. Cl.
CPC .............. *G01K 7/16* (2013.01); *G01M 3/04* (2013.01); *G01K 2007/166* (2013.01)

(58) Field of Classification Search
CPC ...... G01K 7/00; G01K 7/16; G01K 2007/166; G01M 3/04; G01M 3/08; G01M 3/18; G01M 3/24; G01M 3/40
See application file for complete search history.

(56) References Cited

U.S. PATENT DOCUMENTS 3,510,762 A * 5/1970 Leslie ................... G01M 3/002
                                                   174/11 R
3,600,674 A * 8/1971 Roberts ..................... F17D 5/06
                                                   174/11 R
(Continued)

FOREIGN PATENT DOCUMENTS

FR      2 292 962 A1    6/1976
WO    2009/138391 A1   11/2009

OTHER PUBLICATIONS

Wikipedia, Time Domain Reflectometer, 2014 (Year: 2014).*
Naik et al., Multicarrier Reflectometry, IEEE Sensors Journal, vol. 6, No. 3, Jun. 2006 (Year: 2006).*

*Primary Examiner* — Nguyen Q. Ha
(74) *Attorney, Agent, or Firm* — Baker & Hostetler LLP

(57) ABSTRACT

A method uses at least: one line made up of at least two conductors insulated by a material whose insulation impedance depends locally on the temperature, the line running through the installation; a reflectometer periodically transmitting a reflectometry signal at one end of the line, the signal being propagated along the line, the reflectometer measuring the echoes received and comparing the amplitudes of the echoes with a given reference; a hot spot being detected when the amplitudes of a given number of successive echoes are greater than the given reference, the echoes being provoked by a local reduction of the value of the insulation impedance.

11 Claims, 3 Drawing Sheets

(51) Int. Cl.
    *G01M 3/04*     (2006.01)
    *G01M 3/08*     (2006.01)
    *G01M 3/18*     (2006.01)

(56) References Cited

U.S. PATENT DOCUMENTS

| | | | | |
|---|---|---|---|---|
| 3,938,385 | A * | 2/1976 | Horwath | G01K 1/026 |
| | | | | 374/137 |
| 3,981,181 | A * | 9/1976 | Ochiai | G01M 3/045 |
| | | | | 73/40.5 R |
| 4,023,412 | A | 5/1977 | Luke et al. | |
| 4,638,107 | A * | 1/1987 | Davis | G01K 7/00 |
| | | | | 136/237 |
| 4,797,621 | A * | 1/1989 | Anderson | G01M 3/165 |
| | | | | 324/533 |
| 5,185,594 | A | 2/1993 | Dechurch | |
| 5,412,374 | A * | 5/1995 | Clinton | G08B 17/06 |
| | | | | 340/584 |
| 5,793,293 | A | 8/1998 | Melamud et al. | |
| 6,509,740 | B1 * | 1/2003 | Needle | G01R 31/11 |
| | | | | 324/533 |
| 2011/0102183 | A1 | 5/2011 | Tenchio | |

* cited by examiner

METHOD AND DEVICE FOR DETECTING HOT POINTS IN A FACILITY, ESPECIALLY FOR DETECTING LEAKS IN AIR DUCTS

CROSS-REFERENCE TO RELATED APPLICATIONS

This application is a National Stage of International patent application PCT/EP2015/073827, filed on Oct. 15, 2015, which claims priority to foreign French patent application No. FR 1461710, filed on Dec. 1, 2014, the disclosures of which are incorporated by reference in their entirety.

FIELD OF THE INVENTION

The present invention relates to a method and a device for detecting hot spots in an installation. It applies in particular for the detection of leaks in air ducts, particularly in airplanes.

BACKGROUND

Hereinbelow, the air taken at the compression stage of a turbine engine will be able to be called "bleed". In modern airplanes this hot air can be used to activate de-icing cells, pressurize and heat the cabin, pressurize the hydraulic tanks or pneumatic actuators or even pre-heat the brakes.

In the airplanes, the "bleed" can reach very high temperatures. One problem to be resolved is how to detect the leaks of hot air along ducts in which this air circulates.

In one known solution, detection loops are installed that are made up of heat-sensitive cables having temperature-dependent characteristics. These heat-sensitive cables are installed along ducts in order to be able to react to the changes of temperature induced by leaks. Thus, when a leak occurs in a duct, the flow of hot air impacting on the heat-sensitive cable makes it react.

The detection loop is made up of coaxial cables whose two conductors are insulated by a eutectic salt that is highly insulating in the nominal state but gauged to melt at a specific temperature. This chemical property is reversible. In the case of a leak, the heat-sensitive cable therefore behaves locally as a quasi-short-circuit 2. The closed loop provokes an alert which is sent to the cockpit.

The "leak" information item is transmitted to the maintenance teams. However, this information item does not accurately indicate the location of the leak.

More often than not, a resistance measurement or a capacitance measurement is performed from each end of the loop as illustrated in FIG. 1. By knowing the resistance per unit of length of the cable 1, the point of the cable where the leak has occurred is deduced therefrom from measurements 11 and 12 of resistances R1, R2 performed from each end of the loop. The measurements give:

$$R1 = 2\rho L_{hot}$$

$$R2 = 2\rho(L - L_{hot})$$

L being the total length of the coaxial cable, and $L_{hot}$ being the length from the first end to the hot air leak. The factor 2 takes account of the fact that the lengths $L_{hot}$ or $(L-L_{hot})$ are travelled in outward and return directions by the measurement current to the short circuit.

The length $L_{hot} = L/(1+R1/R2)$ is deduced naturally therefrom.

In practice, the aging of the cable produces measurement uncertainties. In particular, the cable does not age or degrade uniformly. In effect, the spot increases in resistance per unit of length can occur at certain points of the cable. False alarms also arise whose origin is not clearly identified.

Thus, the solutions of the prior art therefore present a number of drawbacks, in particular:

the locating accuracy is poor;

the nominal resistance may be subject to variation depending on the age and the state of disrepair of the loop;

a continuity measurement requiring access to both ends is required to permanently check that the loop is not cut;

a degradation may arise locally at the junctions of the heat-sensitive cables, increasing the contact resistance and skewing the leak location measurement.

SUMMARY OF THE INVENTION

One aim of the invention is in particular to mitigate the abovementioned drawbacks. To this end, the subject of the invention is a method for detecting a hot spot in an installation, said method using at least:

one line made up of at least two conductors insulated by a material whose insulation impedance depends locally on the temperature, said line running through said installation;

a reflectometer periodically transmitting a reflectometry signal at one end of said line, said signal being propagated along said line, said reflectometer measuring the echoes received and comparing the amplitudes of said echoes with a given reference;

a hot spot being detected when the amplitudes of a given number of successive echoes are increasingly greater than said given reference, said echoes being provoked by a reduction of the local value of said insulation impedance.

The calculations for locating the local reduction of impedance are for example performed when said hot spot is detected.

In a particular implementation, the measurements performed by said reflectometer are reflectometry measurements of multicarrier type called MCTDR.

Said reflectometer performs, for example, a comparison of said amplitudes with a second reference, called initial reference, said second reference being less than said given reference, an information item being generated when at least one of said amplitudes exceeds said initial reference. Said initial reference is for example greater than or equal to the amplitudes of the echoes received when said line is in so-called initial given operating conditions. Said given reference is for example modified when at least one measured amplitude exceeds said initial reference. The new value of said given reference is for example greater than said measured amplitude.

In another possible implementation, a reflectometry signal being injected on the second end of said line, the echoes received at this end are measured and compared to at least said given reference.

Said installation being for example an air duct, said line being placed in proximity along said duct, said method can be applied to the detection of leaks in said duct, a leak provoking a local temperature rise forming a hot spot, said air duct being for example situated in an aircraft.

Another subject of the invention is a device for detecting a hot spot in an installation, said device comprising at least:

one line made up of at least two conductors insulated by a material whose insulation impedance depends locally on the temperature, said line being able to run through said installation;

a reflectometer capable of periodically transmitting a reflectometry signal at one end of said line and of measuring the echoes received;

said device implementing the method as described previously.

BRIEF DESCRIPTION OF THE DRAWINGS

Other features and advantages of the invention will become apparent from the following description, given in light of the attached drawings which represent:

FIG. 2 presents an example of detection device implementing according to the invention. This device comprises at least one reflectometry system 21, or reflectometer, and a heat-sensitive coaxial cable 22 capable of being installed along a duct conveying hot air, the cable is represented in the figure by its characteristic impedance 20. The heat-sensitive coaxial cable is for example of the type of that described previously. In all cases, it is characterized by a modification of the dielectric or insulation properties of the material insulating the central conductor, or central core, and the peripheral conductor, or shielding. This coaxial cable could be replaced by any two-wire lines in which the two conductors are separated by an insulating material whose insulation characteristics vary with temperature. The insulation is characterized by a resistance whose value tends toward infinity at a temperature corresponding to normal conditions, this value decreasing from a given temperature to reach a very low resistance value, almost zero, through the rising temperature.

Figure 1:
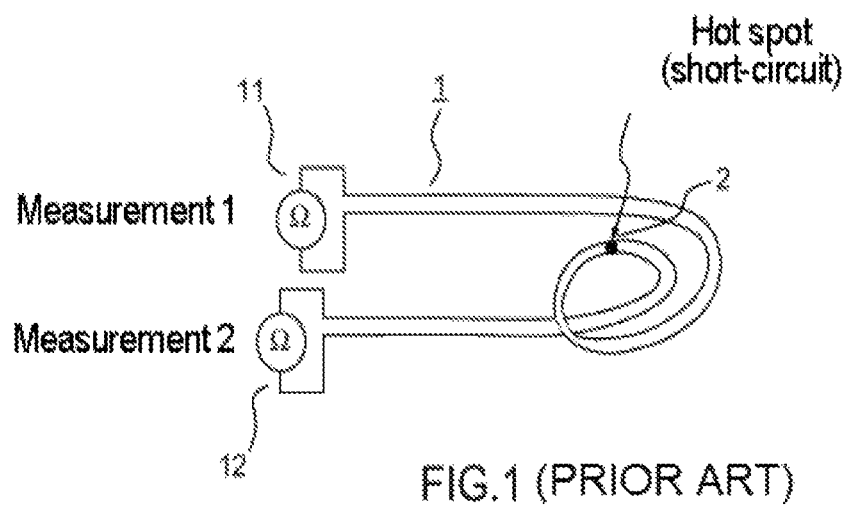
FIG. 1, already described, a detection loop installed along a duct conveying hot air.

The invention will nevertheless be described in the case of use of a coaxial cable. The coaxial cable is not connected in a loop. In particular, one of its ends is linked to the reflectometry system 21 and the other end is for example open circuit 23, making it possible to reduce the length of cable, which is a substantial advantage, particularly for an avionic application. With a device according to the invention it is in fact no longer necessary to use a cable 22, or a line, connected in a loop. A loop configuration can nevertheless be used, particularly to increase the location accuracy or to ensure information redundancy.

This cable 22 is installed along the duct so as to react to a rise produced by a leak of hot air. It can be fixed to the duct or fixed to a support in proximity to the duct.

The method according to the invention is therefore based on the reflectometry techniques for locating hot points due to a "bleed" leak. The reflectometry system 21 used for example performs multicarrier reflectometry measurements, called MCTDR, but any other type of reflectometry probe signal may be suitable, provided that the bandwidth is matched to the length of the cable 22. The injection signal for example observes at least the following three conditions:

the frequency band and the sampling of the signal are matched to the length of the cable to ensure that the signal is not completely attenuated, retaining a suitable location accuracy;

the signal observes a condition of perfect harmlessness to the heat-sensitive cable;

the signal observes the standards applicable to the environment of a device implementing the invention, for example EMC.

Advantageously, the MCTDR measurements allow a device according to the invention to be superimposed on current detection systems, already installed for example.

Multicarrier reflectometry measurements are notably described in the document WO2009/138391.

The materials used in the heat-sensitive cable are not as good conductors as copper. The reflectometry signal will therefore undergo a relatively significant attenuation, which limits the range if retaining a good location accuracy is desired. This point is not however very critical in as much as the sum of the lengths of the heat-sensitive elements of the detection loops in the airplanes rarely exceeds 20 meters.

To detect a leak, the device according to the invention uses the local variation of insulation impedance of the cable 22 in line with the link, in particular a reduction of the local value of the insulation impedance in the time domain. In other words, as the air flow increases the temperature of the hot spot situated at the level of the leak, a spot parallel impedance 24 of non-zero value appears between the central core and the shielding of the heat-sensitive cable. The value Zh of this local impedance 24 becomes increasingly low, until an almost clean short-circuit.

The reflectometry system 21 generates a source signal which is propagated in the heat-sensitive cable 22. When it has arrived at the hot spot, a part of the energy is reflected to the source, at the reflectometry system level, while the rest of the signal is transmitted to the end of the cable, at the open circuit 23 level. The echo obtained in the absence of hot spot is denoted Γ, this echo Γ being produced by the reflection of the reflectometry signal on the open circuit 23.

By using $Z_c$ to denote the value of the characteristic impedance 20 of the cable and $Z_h$ to denote the value of the insulation impedance 24 appearing at the hot spot, the hot spot will modify the echo Γ into an echo Γ' according to the following relationship (1):

$$\Gamma' = \frac{2Z_c Z_h \Gamma - Z_c^2(1+\Gamma)}{2Z_c Z_h + Z_c^2(1+\Gamma)}$$

In the absence of hot spot, $Z_h$ is infinite, so therefore Γ'=Γ, in fact:

$$Z_h \to \infty \Rightarrow \Gamma' \to \frac{2Z_c Z_h \Gamma}{2Z_c Z_h} = \Gamma$$

In case of a total, clean short-circuit, $Z_h$ is equal to 0, Γ'=−1, in fact:

$$Z_h \to 0 \Rightarrow \Gamma' \to -1$$

Figure 3:
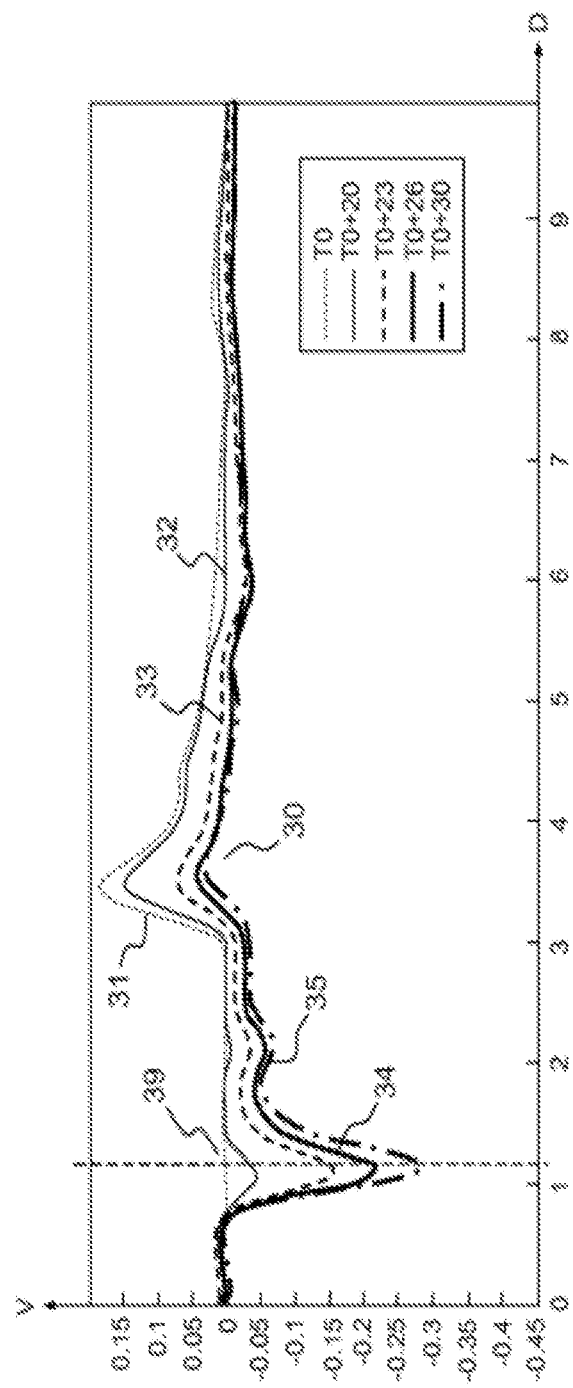
FIG. 3, an illustration of the trend of the reflectometry echoes following the appearance of a hot spot.

FIG. 3 illustrates the value of the echoes between these two extreme values, and more particularly the trend of the echoes from the appearance of a hot spot, in practice from the appearance of a leak in a duct provoking an overheating. FIG. 3 illustrates the trend of the echoes by a representation of the trend of the reflectorgram of the carrier wave, the reflectogram being the signal resulting from the reflectometry measurement.

A first curve 31 represents the echo received by the reflectometer 21 in the case where there is no hot spot, $Z_h$ being infinite. A positive spike 30 corresponds to the reflection on the open circuit 23. A second curve 32 represents the echo in the case of the appearance of a hot spot. A negative spike 39 appears whereas the positive spike 30 is reduced, corresponding to the loss of reflected energy at the hot spot level. The distance to the hot spot is conventionally obtained from the speed of propagation of the reflectometry signal and its echo along the line 22. The curves of FIG. 3 therefore represent the amplitude of the echo received as a function of the distance.

The other curves 33, 34, 35 represent the trend of the echo received over time, the negative spike 39 increasing negatively as a function of the increasing heat, the positive spike decreasing accordingly.

The distance revealed by the negative spike 39 makes it possible to obtain the location of the hot spot. Advantageously, the location accuracy can be less than 1% of the total length of the cable 22.

The invention also and advantageously makes it possible to dispense with local resistance trends independent of temperature, such as, for example, contact resistance increases at certain junctions. In effect, these local problems produce echoes which do not follow the trend of the echoes illustrated by FIG. 3, echoes that are characteristic of the appearance of a hot spot.

Figure 2:
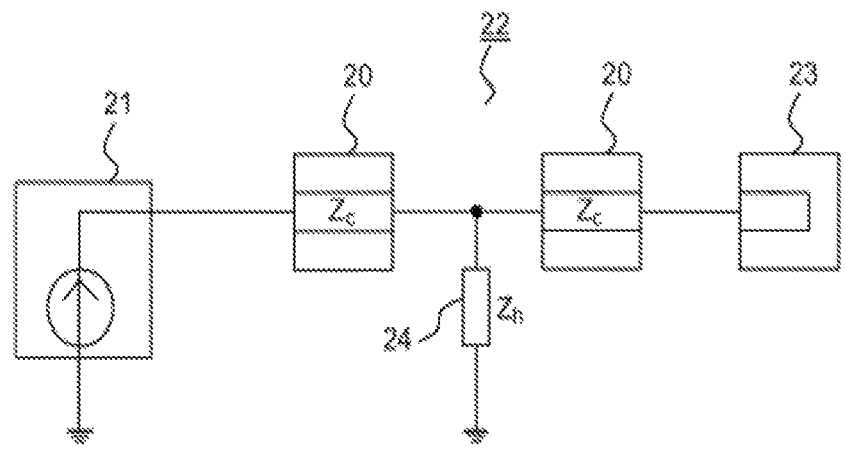
FIG. 2, a theoretical block diagram of a device according to the invention.

The cable can be open circuit as illustrated by FIG. 2 or form a loop. In the latter case, it is linked by its two ends to the reflectometer 21. In a loop configuration, a complementary measurement can be performed at the other end. A second reflectometry signal is thus sent from this other end to confirm the location of the hot spot detected by the signal sent from the first end. The reliability of the information and its accuracy are thus advantageously increased. It is advantageously possible, in this case, to use techniques of D-MCTDR type which makes it possible to inject the signal by both ends at the same time with no synchronization system.

The invention also has the advantage that it can be adapted to existing loops, without their wiring being modified. It is sufficient to provide appropriate connectors to link in particular the reflectometer to the loop and to be superimposed on the detection system already present.

It is possible to calculate the value $Z_h$ of the insulation resistance from the echoes received and deduce therefrom the temperature of the hot spot. To this end, to simplify the calculations, it is possible to assume that there are no losses in the cable 22, the loop being open circuit 23. In this case, the relationship (1) is simplified and a value of the echo Γ' provoked by the hot spot is obtained that is a function only of $Z_h$ and of the characteristic impedance $Z_c$:

$$\Gamma' = \frac{-Z_c}{2Z_h + Z_c}$$

$Z_h$ is deduced from this relationship i.e.:

$$Z_h = -Z_c(1+\Gamma')/2\Gamma' \quad (2)$$

Knowing the trend law of the insulation impedance $Z_h$ as a function of the temperature, the value $T_h$ of the temperature at the hot spot is deduced therefrom.

Figure 4:
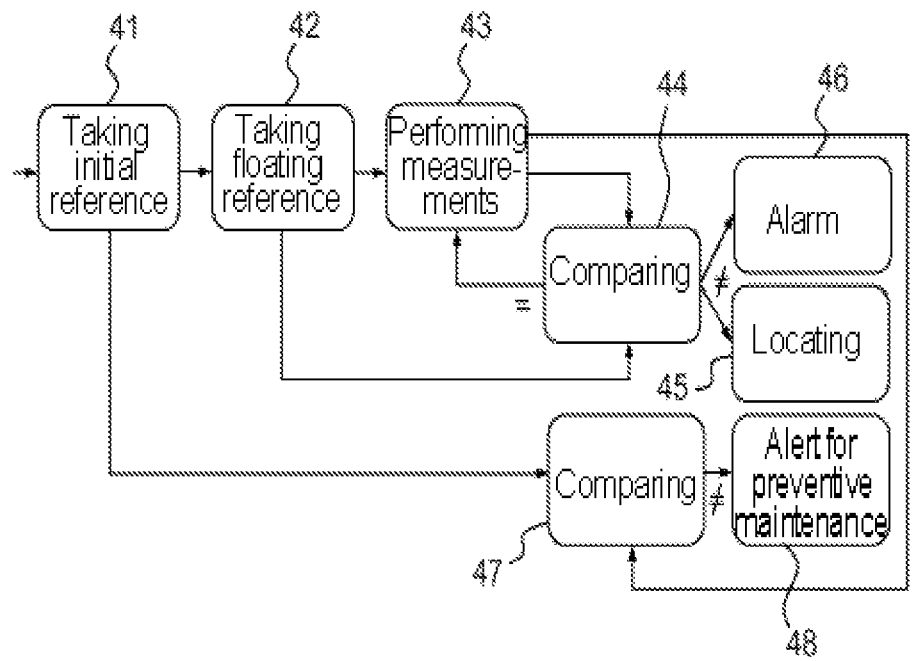
FIG. 4, an example of processing implemented by a device according to the invention.

FIG. 4 presents an example of processing implemented by a device according to the invention advantageously making it possible to compensate the slow drifts in the heat-sensitive performance levels of the cable 22, and also to measure these drifts, these measurements being able to be used for maintenance operations.

In a preliminary step, the reflectogram of the line, looped or open circuit, is recorded. This reflectogram is obtained from in-situ measurements, that is to say with the line arranged along the duct to be monitored, installed operationally. The recorded reflectogram has a profile of the type of the curve 31 of FIG. 3 corresponding to the absence of hot spot and constitutes the original profile or reference profile. This profile can be regularly measured and compared to the reference profile to measure the slow drifts of the line. These measurements can be used subsequently in maintenance to identify the drifts and anticipate failings. The slow drifts can notably be due to the aging of the cable or even to changes of season. In practice, a particular echo corresponds to the reference profile, the measurements of the drift are therefore made relative to this echo forming the initial reference.

The initial reference 41 is also used in operation phase as in the example illustrated by FIG. 4 for an embedded application. In this operational phase, the invention makes it possible to discriminate the rapid drifts, due to a temperature increase, from the slow drifts, while measuring the latter. The device therefore retains the initial reference echo 41 to identify the slow drifts of the line and for example propose preventive maintenance.

To identify the rapid drifts, provoked by appearance of hot spots, the device according to the invention uses a floating reference 42, this reference being modified in time. This floating reference makes it possible in particular to not take account of the slow drifts and thus eliminates many sources of false alarms. The device regularly emits signals to perform the reflectometry measurements 43. After each signal emitted the echoes received are measured and then compared 44 to the floating reference 42. If the amplitude of the current echo measured is less than the floating reference, another signal is emitted then another measurement is performed and compared. When the amplitudes of a given number of successive echoes are increasingly greater than the floating reference, according to the profile of FIG. 3, that is to say that the difference relative to the reference increases over time, this is an information item indicating the presence of a hot spot. The taking into account of several successive measurements allow to disregard faults which would not be due to the appearance of hot spots. In an extreme case, it is, however, possible to take this given number as equal to 1.

A calculation of location 45 of the change of insulation impedance $Z_h$ is then performed according to the known rules of reflectometry, this location indicating the point of appearance of the hot spot. In parallel, an alarm signal 46 is generated. To confirm the appearance of the hot spot, several successive measurements are for example made to check whether profiles of the type of those of FIG. 3 are obtained. In effect, the trend of the measurements should correspond to the appearance of a hot spot. As indicated previously, in case of a loop connection of the line 22, a complementary reflectometry measurement can be made at a second end. Given the time constants involved, all these complementary measurements can be performed without problems.

In parallel with the comparisons 44 of the current echoes with the floating reference, comparisons 47 of these echoes are performed with the initial reference. These comparisons 47 can be performed at a lower rate than the preceding ones 44. In effect, given that it involves measurement of slow drifts, it is not necessary to perform comparisons according to short periods. If the result of the comparison 47 between the amplitude of the current echo and the initial reference is greater than a given threshold, an alert 48 is generated in particular for preventive maintenance. This alert can be stored or sent to a maintenance center. The value of the floating reference can be modified following the result of this comparison. In particular, the new value of the floating reference can be chosen to be greater than the amplitude of the echo thus detected.

The invention has been described for the detection of leaks in air ducts, particularly in aircraft. However, the invention can advantageously be applied for the detection of hot spots in installations other than air ducts, making it possible to detect other causes of hot spots, for example beginnings of fire. In this case, the line 22 runs through the installation to be monitored, the run being chosen in a way appropriate to the type of monitoring or protection that is desired.

For avionics applications, a device according to the invention is not necessarily embedded. It is in fact possible to use it in maintenance mode.

The invention claimed is:

1. A method for detecting a hot spot in an installation, wherein said method uses at least:
   one line made up of at least two conductors insulated by a material whose insulation impedance depends locally on temperature, said line running through said installation;
   a reflectometer periodically transmitting a reflectometry signal at one end of said line, said signal being propagated along said line, said reflectometer measuring the echoes received and comparing amplitudes of said echoes with a given reference, a reflectometry signal being injected on a second end of said line, the echoes received at this end being measured and compared to at least said given reference;
   a hot spot being detected when the amplitudes of a given number of successive echoes are increasingly greater than said given reference, said echoes being provoked by a reduction of a local value of said insulation impedance.

2. The method as claimed in claim 1, wherein calculations for locating the local reduction of impedance are performed when said hot spot is detected.

3. The method as claimed in claim 1, wherein the line is a coaxial cable.

4. The method as claimed in claim 1, wherein the measurements performed by said reflectometer are reflectometry measurements of multicarrier type called MCTDR.

5. The method as claimed in claim 1, wherein said reflectometer performs a comparison of said amplitudes with a second reference, called initial reference, said second reference being less than said given reference, an information item being generated when at least one of said amplitudes exceeds said initial reference.

6. The method as claimed in claim 5, wherein said initial reference is greater than or equal to the amplitudes of the echoes received when said line is in so-called initial given operating conditions.

7. The method as claimed in claim 5, wherein said given reference is modified when at least one measured amplitude exceeds said initial reference.

8. The method as claimed in claim 7, wherein a new value of said given reference is greater than said measured amplitude.

9. The method as claimed in claim 1, wherein, said installation being an air duct, said line being placed in proximity along said duct, said method is applied to detection of leaks in said duct, a leak provoking a local temperature rise forming a hot spot.

10. The method as claimed in claim 9, wherein said air duct is situated in an aircraft.

11. A device for detecting a hot spot in an installation, wherein said device comprises at least:
    one line made up of at least two conductors insulated by a material whose insulation impedance depends locally on temperature, said line being able to run through said installation;
    a reflectometer capable of periodically transmitting a reflectometry signal at one end of said line and of measuring the echoes received;
    said device implementing the method as claimed in claim 1.

* * * * *